(12) United States Patent
Färber

(10) Patent No.: US 9,227,489 B2
(45) Date of Patent: Jan. 5, 2016

(54) SIDE PANEL OF A VEHICLE ROOF THAT CAN BE OPENED

(75) Inventor: Manfred Färber, Wellenbach (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 14/358,410

(22) PCT Filed: Apr. 2, 2012

(86) PCT No.: PCT/EP2012/001462
§ 371 (c)(1),
(2), (4) Date: Jul. 7, 2014

(87) PCT Pub. No.: WO2013/079125
PCT Pub. Date: Jun. 6, 2013

(65) Prior Publication Data
US 2014/0319882 A1     Oct. 30, 2014

(30) Foreign Application Priority Data

Dec. 2, 2011 (DE) .......................... 10 2011 119 991

(51) Int. Cl.
*B60J 7/22* (2006.01)
*B60J 7/00* (2006.01)

(52) U.S. Cl.
CPC .................................... *B60J 7/0046* (2013.01)

(58) Field of Classification Search
CPC .................................. B60J 7/22; B62J 7/0046
USPC .................................. 296/217, 216.02, 216.08
See application file for complete search history.

(56) References Cited

U.S. PATENT DOCUMENTS

| | | | | |
|---|---|---|---|---|
| 1,603,181 | A | * | 10/1926 | Aborn .............................. 160/88 |
| 1,603,182 | A | * | 10/1926 | Aborn .......................... 296/146.4 |
| 6,457,769 | B2 | * | 10/2002 | Hertel et al. ................... 296/217 |
| 6,817,658 | B2 | | 11/2004 | Ohnishi et al. |
| 7,753,428 | B2 | | 7/2010 | Kato et al. |
| 8,419,120 | B2 | * | 4/2013 | Babbage et al. ......... 296/216.02 |

FOREIGN PATENT DOCUMENTS

| | | |
|---|---|---|
| CN | 1453159 A | 11/2003 |
| CN | 101367327 A | 2/2009 |
| DE | 201 04 988 U1 | 10/2001 |
| DE | 103 04 506 A1 | 8/2004 |
| DE | 10 2007 056 797 B3 | 4/2009 |
| DE | 10 2008 015 669 B3 | 12/2009 |
| JP | 2006-315615 A | 11/2006 |

OTHER PUBLICATIONS

International Patentability Report on Patentability (Translation).
International Search Report dated Jul. 24, 2012, issued in International Application PCT/EP2012/001462.
International Preliminary Examination Report dated Mar. 13, 2014, issued in International Application PCT/EP2012/001462.
Chinese Search Report issued against corresponding Chinese Application No. 201280058653.4.

* cited by examiner

*Primary Examiner* — Dennis H Pedder
(74) *Attorney, Agent, or Firm* — Fitch, Even, Tabin & Flannery LLP

(57) ABSTRACT

The invention relates to a side panel of a vehicle roof that can be opened, which is provided for closing a lateral opening between a cover raised over the vehicle roof and the adjoining vehicle roof and has a pivot mounting which can be attached on the roof side, wherein according to the present embodiments the pivot mounting extends along the side panel and in particular the pivot mounting has a curved or bowed pivot pin.

10 Claims, 17 Drawing Sheets

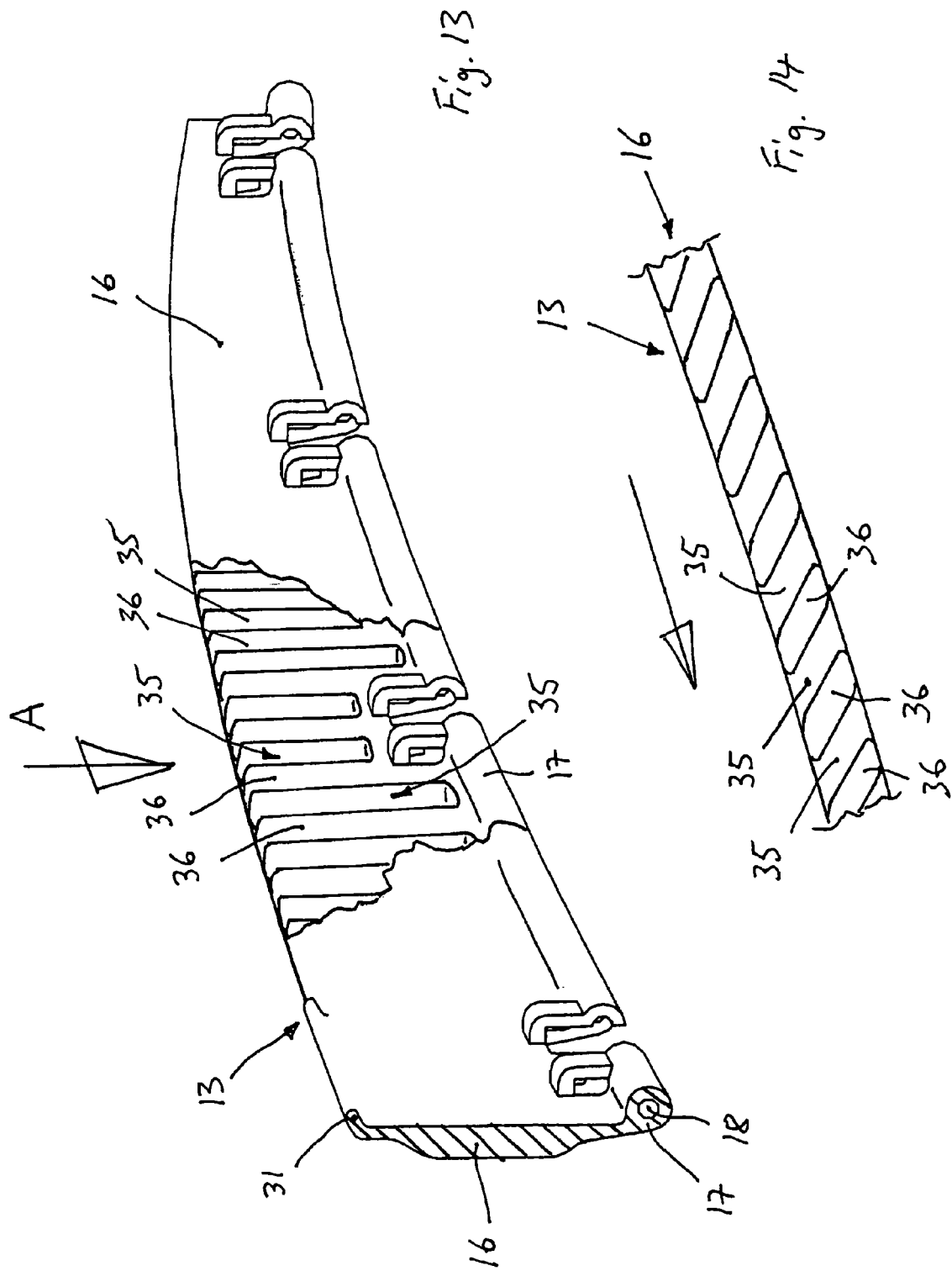

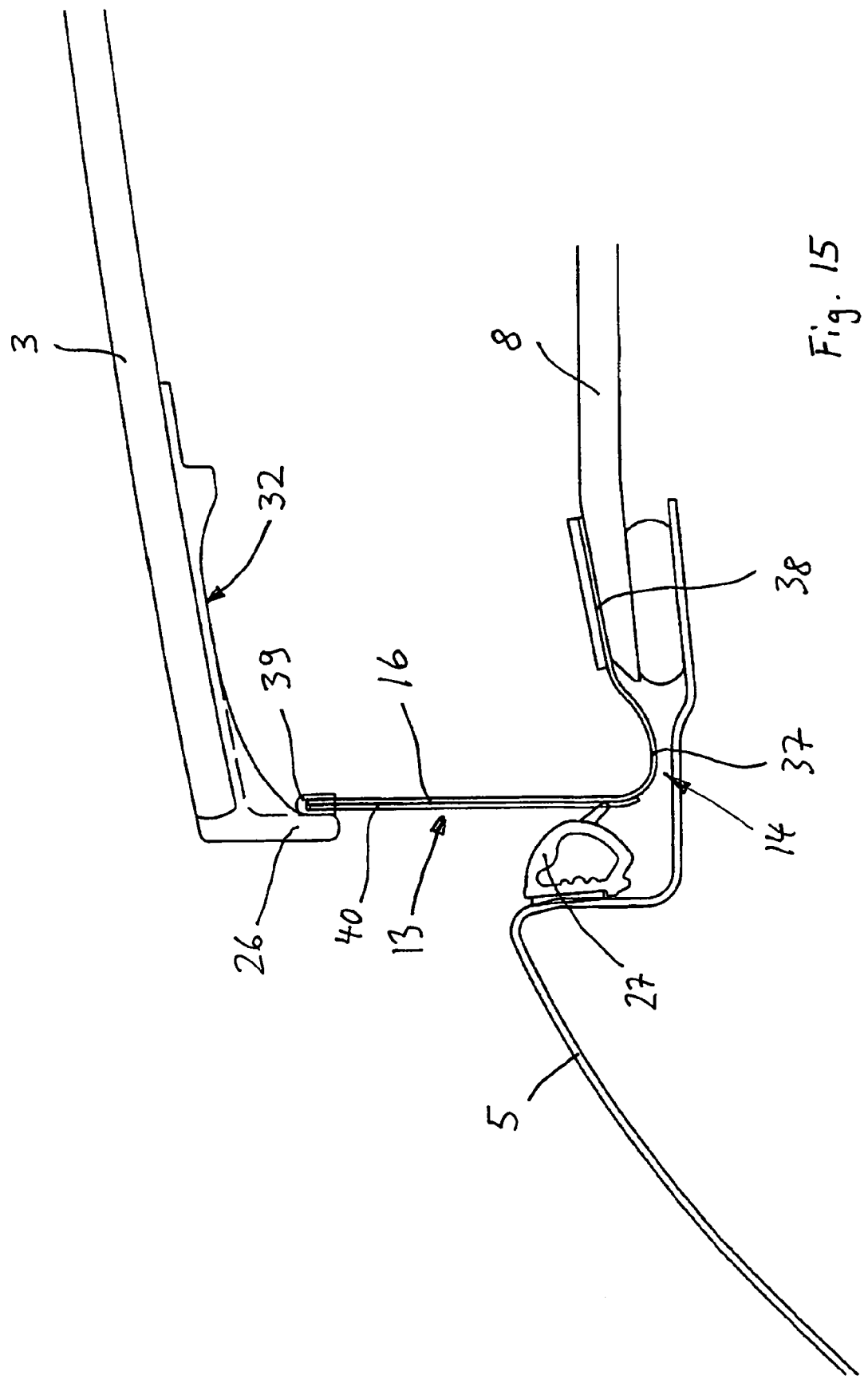

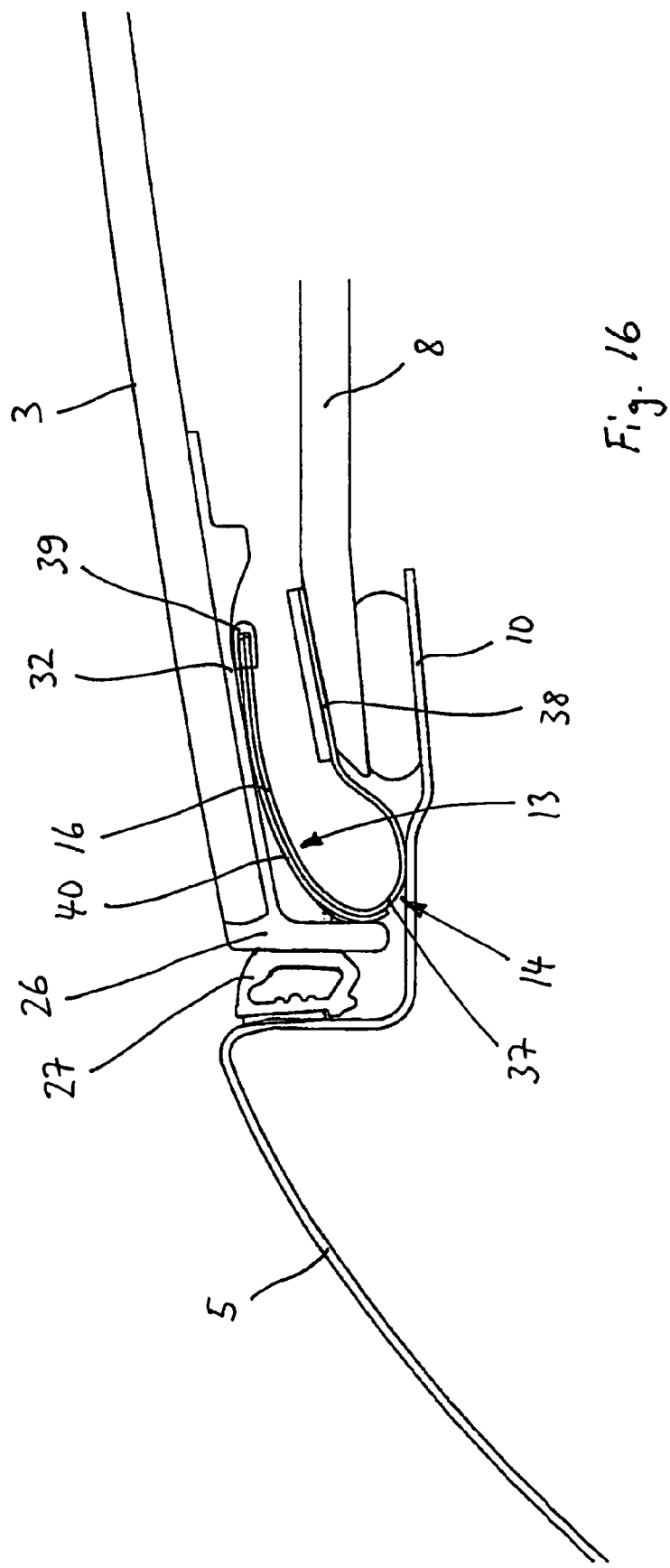

SIDE PANEL OF A VEHICLE ROOF THAT CAN BE OPENED

CROSS REFERENCE TO RELATED APPLICATIONS

Figure 1:
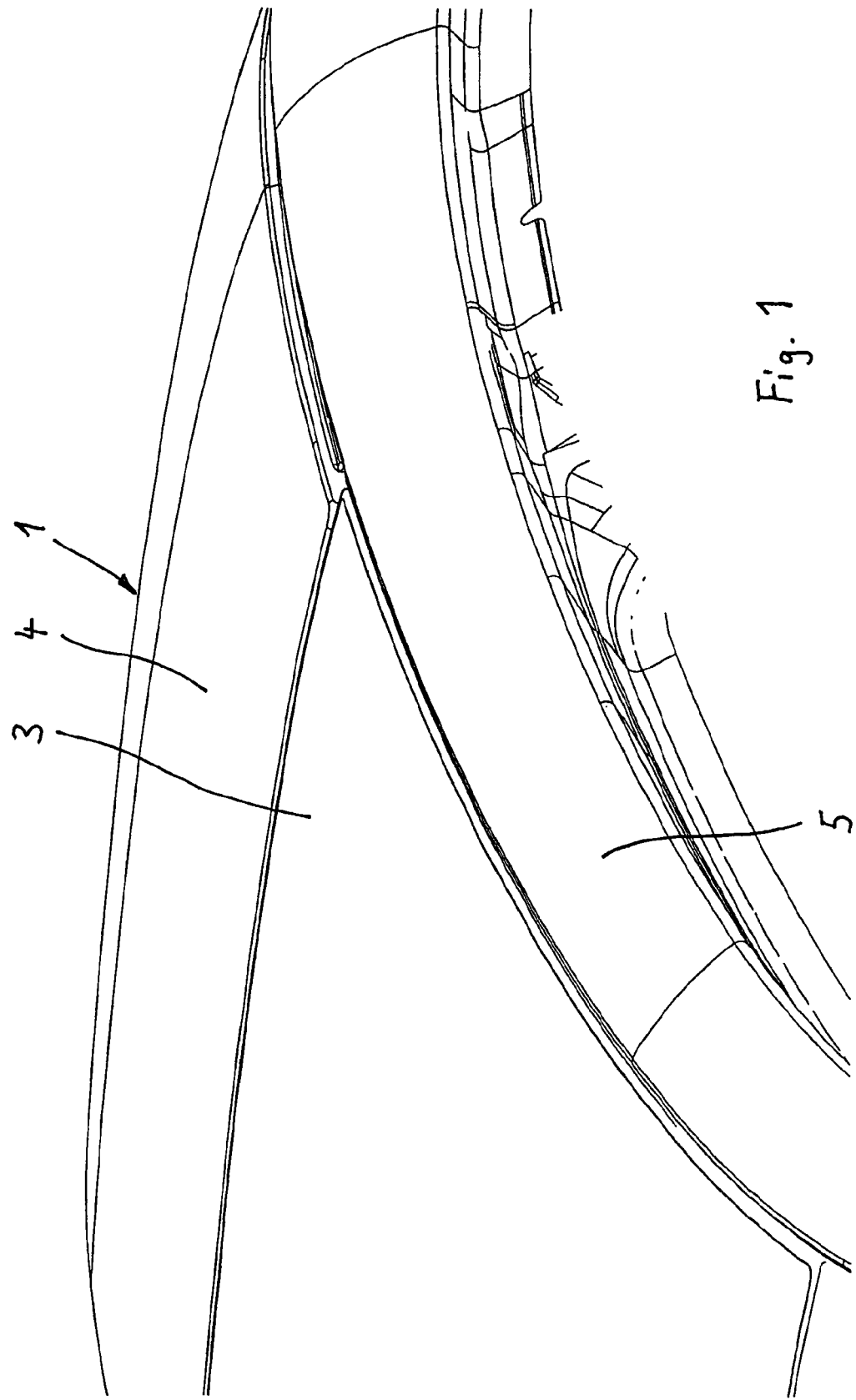

This application is a U.S. national phase application of International Application No. PCT/EP2012/001462, filed Apr. 2, 2012, which claims benefit of the priority date of German Application 10 2011 119 991.1, filed Dec. 2, 2011, which are hereby incorporated herein by reference in their entirety.

The invention relates to a side panel of a vehicle roof that can be opened, which is provided for closing a lateral opening between a cover raised over the vehicle roof and the adjoining vehicle roof, and which has a pivot mounting attachable on the roof side.

From DE 10 2008 015 669 B3 a generic side panel has been known which is accommodated as a rigid slat when the cover of the vehicle roof to be opened is closed, in a panel well of a panel box under the lateral edge of the cover, and is able to be pivoted vertically upward out of the panel well about a pivoting axis running on its front end in a direction transverse to the roof, when the cover pivots out over the vehicle roof. However, the panel box with the panel well requires a large space, especially vertically, on the lateral roof rail in the area next to the opening of the vehicle roof.

The problem that is the basis of the invention is to produce a side panel as named initially, which is improved as regards to its functionality, its possibilities for use, and the required accommodation space, as well as making available a vehicle roof with such a side panel.

This problem is solved according to the invention with the side panel named initially, in that the pivot mounting extends along the side panel.

The problem is also solved by a vehicle roof that can be opened with a roof opening and a cover that can be raised out of the opening, and with a side panel according to one of claims 1 to 11.

Advantageous embodiments of the invention are named in the dependent claims.

Since the pivot mounting extends along the side panel or a longitudinal edge, especially like a lower edge relative to a covered position, the side panel can be pivoted about its longitudinal axis in the transverse direction, thereby requiring a particularly small design space in the vertical direction. With a side panel pivoted down out of the covering position roughly into a horizontal, flat position, headroom essentially is needed only for the pivot mounting, and thus in essence is determined only by it. Consequently, the pivot mounting or a pivoting axis of the pivot mounting, in the installed position of the side panel, is situated and aligned essentially in the longitudinal roof direction or along a lateral edge of the cover.

If in the preferred embodiment, the invention-specific side panel has a pivot mounting with a curved or bowed pivoting axis, then the side panel, by means of its pivot mounting, can also be attached on curved vehicle roofs with a pivoting axis that runs essentially in the longitudinal roof direction. Also to be considered as a curved vehicle roof is any roof or roof component, such as also a tilt-slide roof, which in a known manner runs curved, bowed or concave in the longitudinal roof direction and/or the transverse roof direction. The course of the pivot axis in the longitudinal roof direction means its basic direction in contrast to the pivot axis running in the transverse direction of the side panel known from DE 10 2008 015 669 B3, and comprises both inclined and slanted curved pivoting axes, which, however in their installed position on the vehicle roof in essence extend in the longitudinal roof direction, so that the side panel is able to be pivoted in the transverse roof direction.

The curved or bowed pivot axis can also be designated, depending on its curvature, as a 2-D axis (for example, curvature within a vertical longitudinal plane of the vehicle) or as a 3-D axis (3-dimensional curvature).

Understood to be roof attachment is any attachment of the pivot mounting which is not on the cover, but on another part of the roof, as for example a frame of the tilt-slide roof to be opened, or a lateral roof rail. Thus the side panel does not travel with the cover when it is shifted in its deployed position to affect a rearward uncovering of the roof opening over the adjoining roof area.

According to a preferred embodiment, the pivot axis is formed as a fixed solid axis of the pivot mounting, about which the side panel can be pivoted.

However, the pivot mounting can also be prepared from a mount section that can be flexibly deformed, so that the particularly curved pivot axis is shifted as an instantaneous pivoting axis corresponding to the particular pivot angle of the side panel, but in essence its curvature can be maintained and/or adapted.

Especially a movable cover of the vehicle roof or of a tilt-slide roof is not rectangular, but rather trapezoid-shaped for example in a top-down view, with the cover in the transverse or width direction exhibiting a front edge that is narrower or shorter than its rear edge. The lateral edges of the cover follow the course of the two lateral roof rails that lie opposite one another, the mutual distance of the lateral roof rails increases starting from the A pillar in the longitudinal direction.

The side panel is attachable or attached on the vehicle roof in such a way that the pivot mounting or the pivot axis runs roughly below the lateral edge of the cover situated in the closed position. If the cover is placed into its ventilation position, lifted or pivoted upwards, the side panel, in its position that is pivoted upward roughly vertically, covers the lateral opening or the lateral gap between the lateral cover edge and the vehicle roof or the lateral roof rail. Provision is thereby especially made that the side panel, on its free outer edge, tightly adjoins the cover, and especially a cover panel provided to project downward, to attain an air flow on the lateral cover edge that is as free of interference as possible when in motion, with the advantage of noise reduction in this area. Thus the side panel covers the mechanical cover components from outside.

In a preferred embodiment, the side panel has a pivot mounting area containing the pivot axis, and a planar panel slat, and the material of the pivot mounting area and the material of the panel slat are designed for flexible deformation when the side panel is pivoted about a curved or bowed pivot axis. Especially the planar panel slat is so configured that it is in fact flexible, but cannot fold or buckle.

In appropriate fashion, the pivot mounting area and the panel slat are formed from the same material, with the same properties that determine ductility. If a pivoting axis with a smaller curvature or bowing is provided, the material has greater resistance to deformation, and, if a pivot axis with a greater curvature or bowing is provided, with less resistance to deformation.

The pivot mounting area can also be formed from a material with greater resistance to deformation and the panel slat can be formed from another material with less resistance to deformation. Such a 2 k panel can thus be designed and adapted in the differing deformation areas through special selection of materials for pivoting axes that have differing curvatures.

Especially plastics or composite materials can be used which are suited to be the materials, but also metallic materials with suitable elastic deformation capacities.

A further preferred embodiment makes provision that the panel slat contains slots which extend from their outer edge toward the pivot mounting area, and form ribs separated from each other, which can be deformed against each other when the side panel pivots. The structural interruption of the otherwise continuous panel slat increases mobility or ductility of the slotted panel slat, so that comparatively hard materials with a high resistance to deformation can also be used. The length or depth of the slots determines the resistance to deformation. In this way the entire panel slat can be slotted, or only certain sections can be slotted in this way. The slots, and also the ribs, can be inclined relative to the outer surface of the panel slat in such a way that incident air flow can be directed past in aerodynamically favorable fashion and minor formation of vortices acts counter to the generation of interference noise.

The side panel can for example be pivoted by a drive mechanism. However, in appropriate fashion the side panel is pivoted by the cover itself. For this, provision can be made that on its underside, the cover has at least one cover guidance curve for pivoting of the side panel. In appropriate fashion, several cover guidance curves, placed at intervals to each other in the longitudinal direction of the cover, are provided, which thus pivot the side panel in multiple sliding contact. This configuration is especially advantageous if the panel slat consists of a material that deforms relatively easily, and the multiple guidance ensures secure pivoting of the side panel over its entire length. In addition, multiple guidance curves can be formed as an overall single-piece guidance curve surface.

Preferably the side panel is pretensioned into an essentially vertical covering position and able to be placed against a stop. As long as the side panel is in adjoining contact with the cover and especially a cover edge on the lateral edge of the cover, the stop has no function. However, if the cover loses contact with the guidance curve, the side panel comes to adjoin the stop and thus maintains its essentially vertical covering position, until contact again resumes with the cover.

Basically the side panel can exhibit any shape suitable for covering an opening. In appropriate fashion the shape of the side panel is adapted to the lateral gap beneath the upward-pivoted cover. In particular, the side panel or the panel slat tapers down in its radial extension relative to the pivot axis, over its length from its rear end toward its front end, and thus is adapted to a gap opening that broadens from front to rear.

Figure 2:
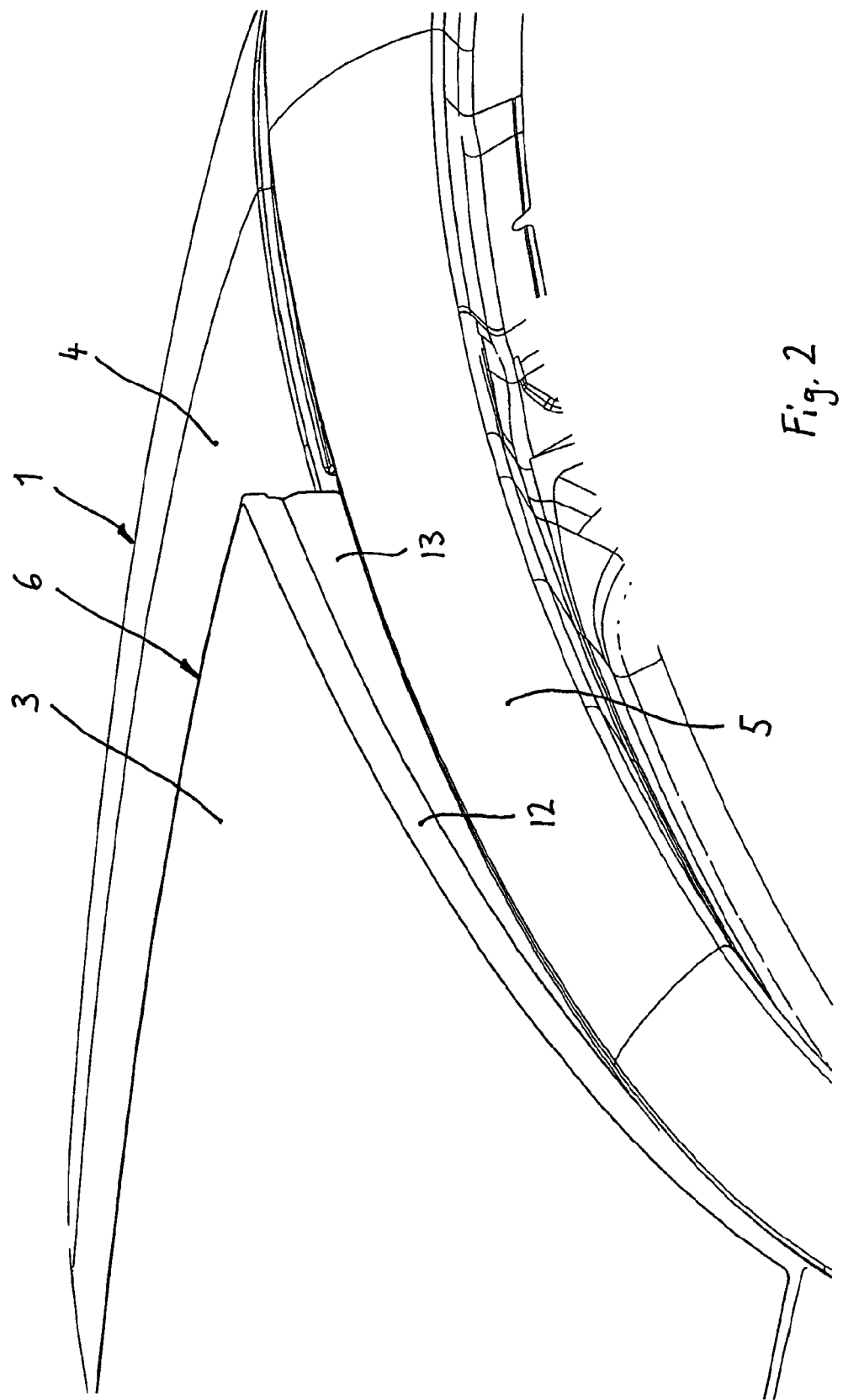
Figure 3:
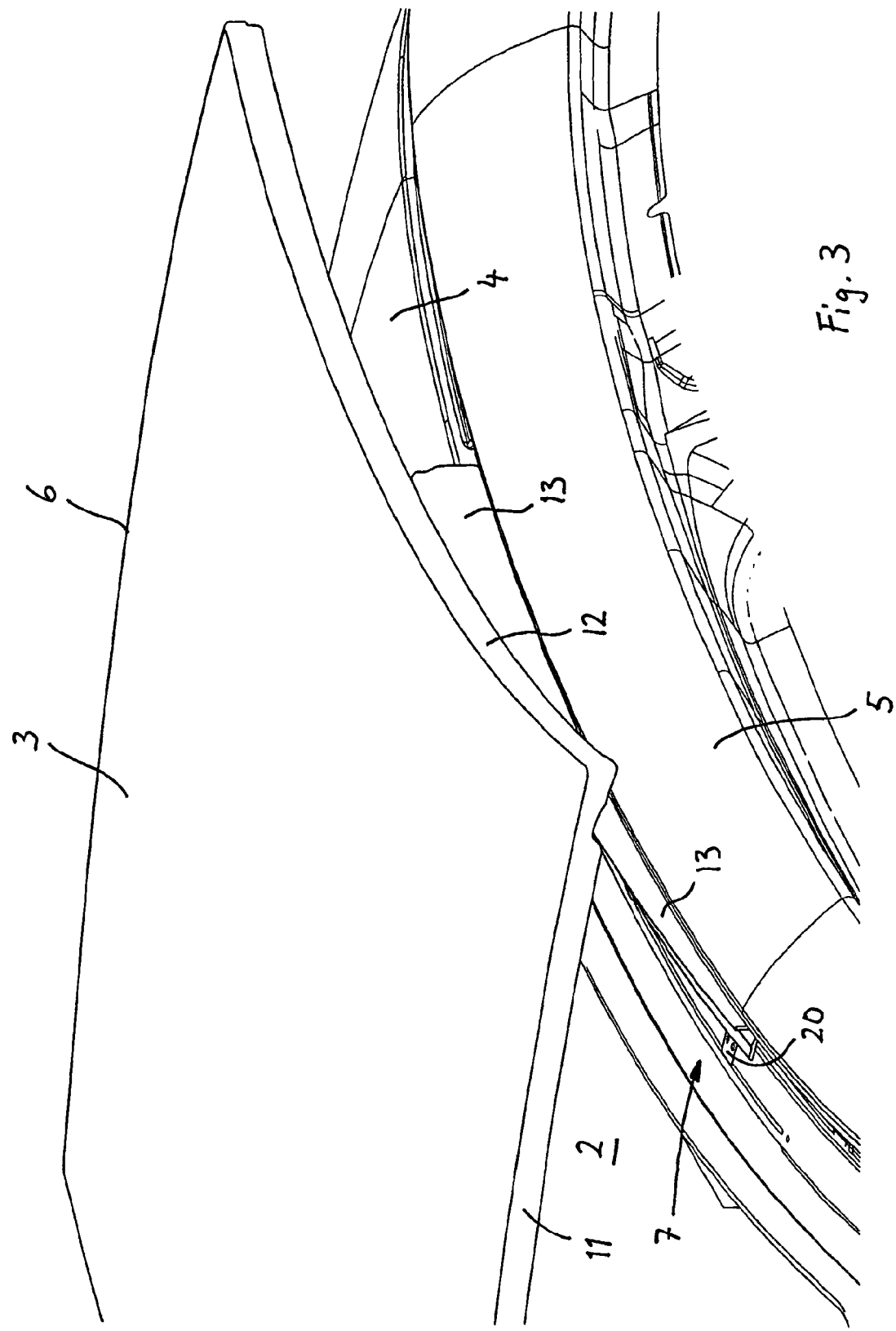
Figure 4:
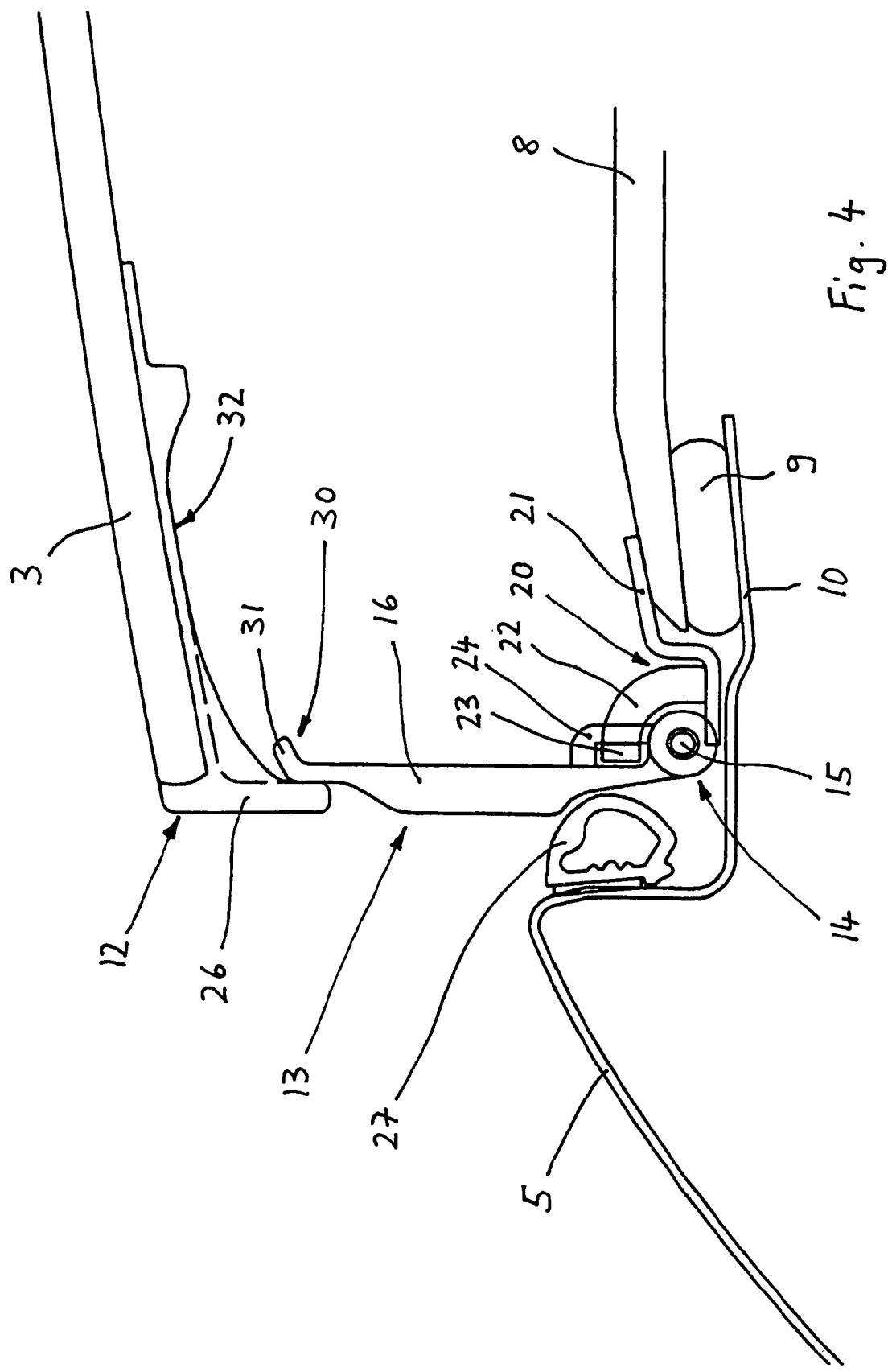
Figure 5:
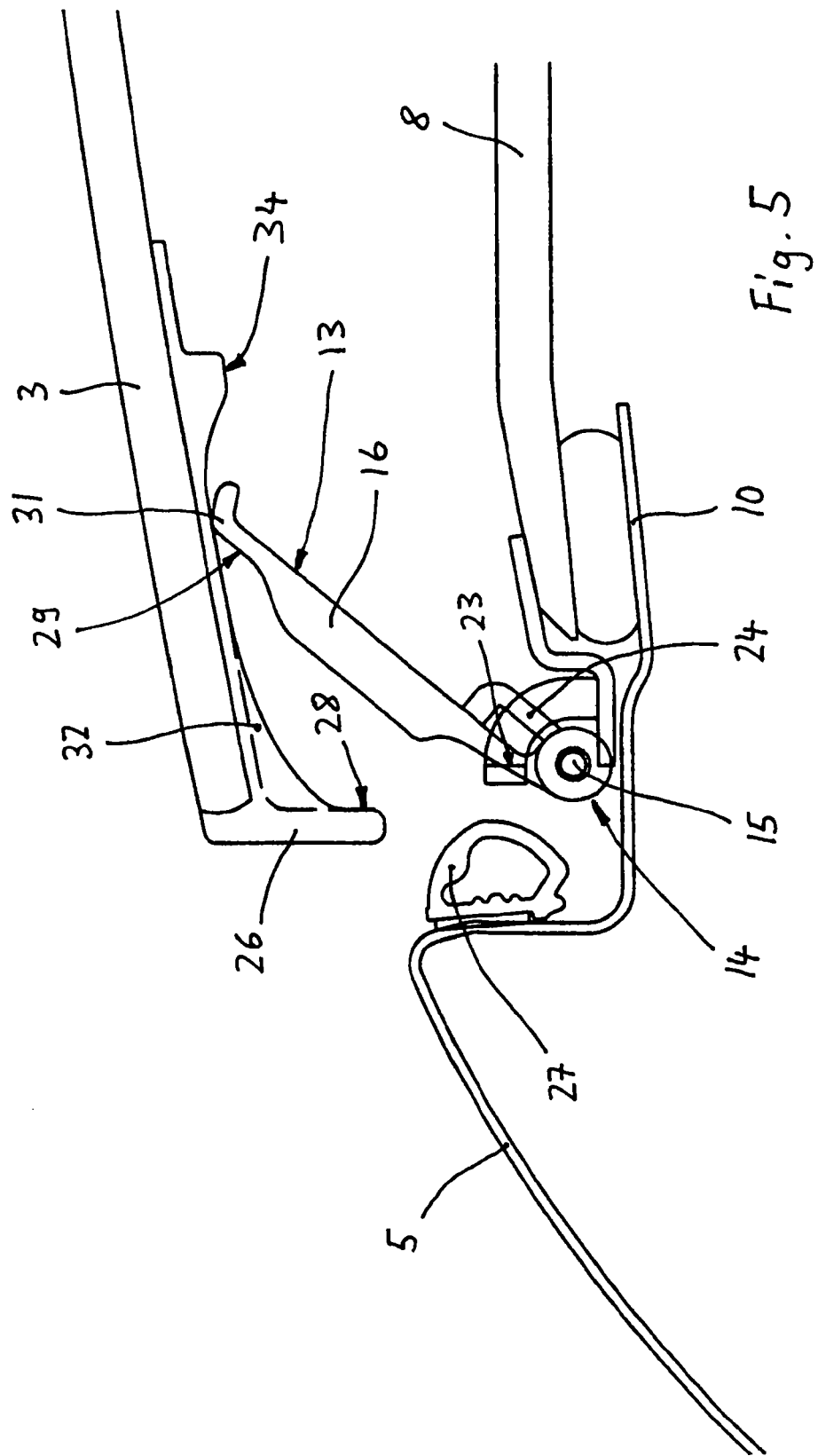
Figure 6:
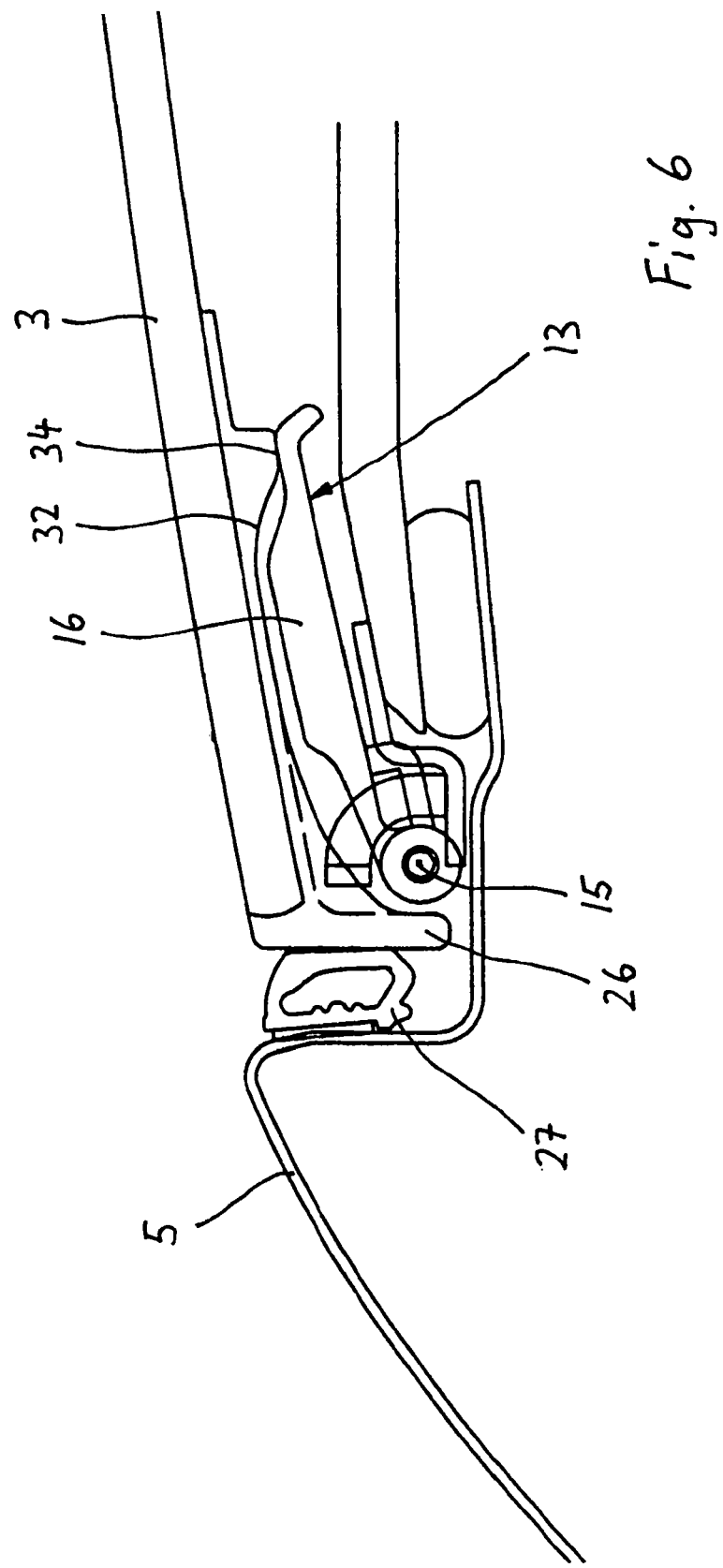
Figure 7:
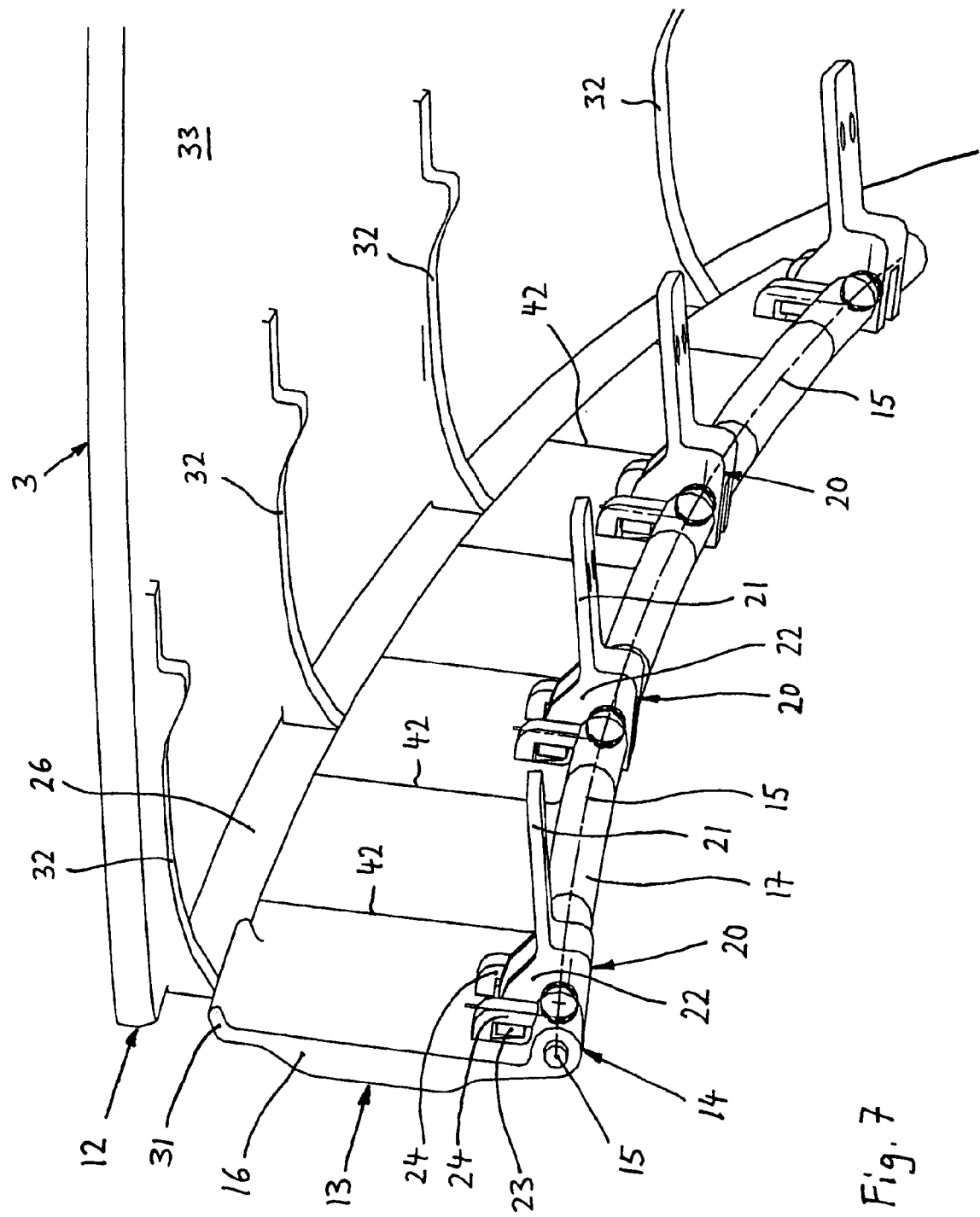

In what follows, the invention shall be explained in greater detail using embodiment examples of an invention-specific side panel while making references to the drawing. Shown are:

FIG. 1 a vehicle roof that can be opened, perspective top-down view, with a cover situated in a closed position in a roof opening FIG. 2 Perspective top-down view as per FIG. 1 of the vehicle roof, with the cover pivoted upward with its rear edge in a ventilation position, and an active side panel for covering of the lateral gap between the cover and the vehicle roof FIG. 3 Perspective top-down view as per FIG. 1 of the vehicle roof, with the upward-pivoted cover displaced rearwards relative to the side panel to reveal the roof opening FIG. 4 Cross-sectional view of the vehicle roof in the area of a roof side rail with the cover placed in the ventilation position FIG. 5 Cross-sectional view as per FIG. 4 of the vehicle roof, with the cover placed in an intermediate pivoted position FIG. 6 Cross-sectional view as per FIG. 4 of the vehicle roof, with the cover placed in the closed position FIG. 7 Perspective head-on view of the lower side of the cover in the position as per FIG. 4 with the side panel placed in the vertical covering position (without the lateral roof rail)

Figure 8:
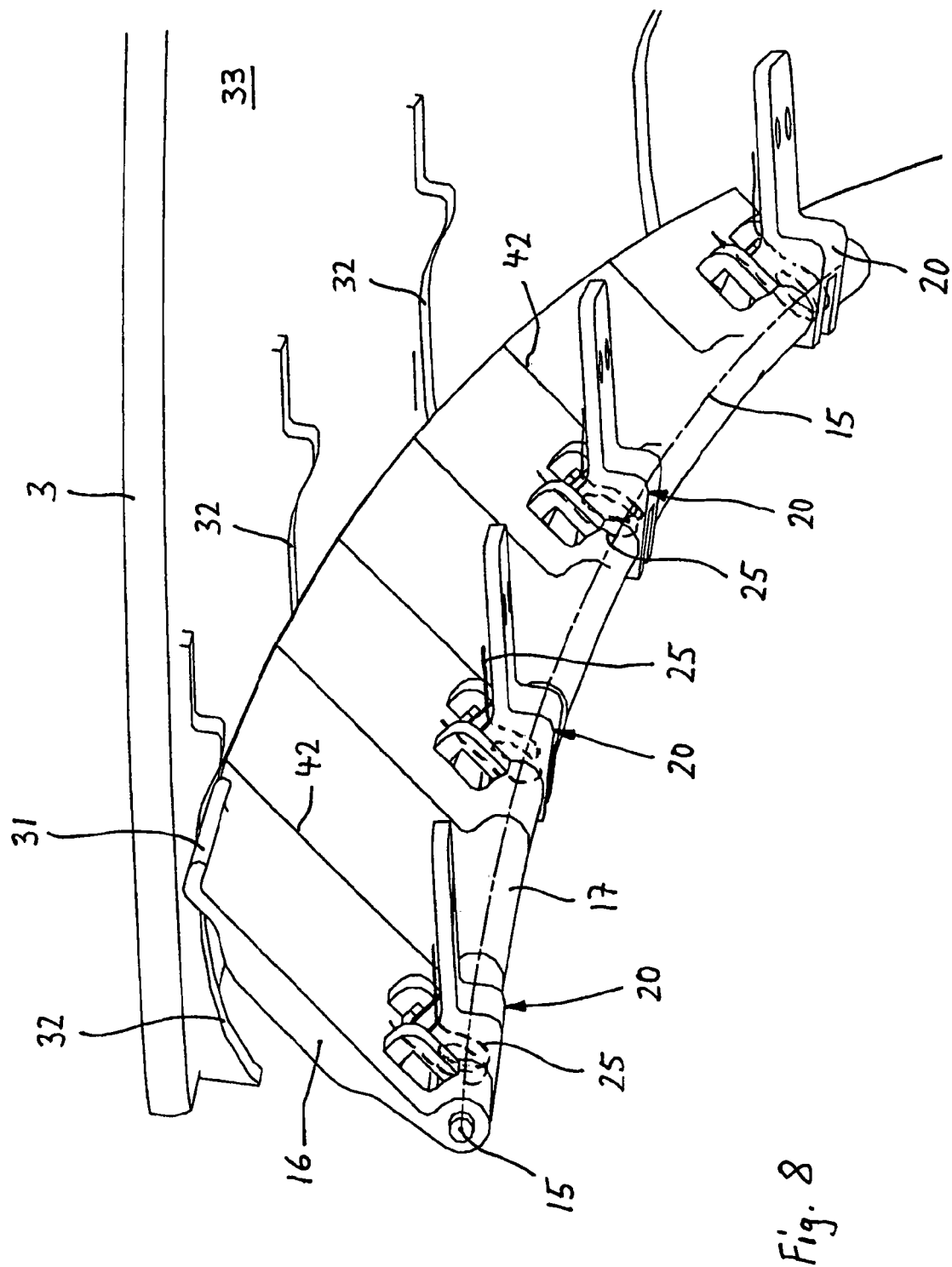
Figure 9:
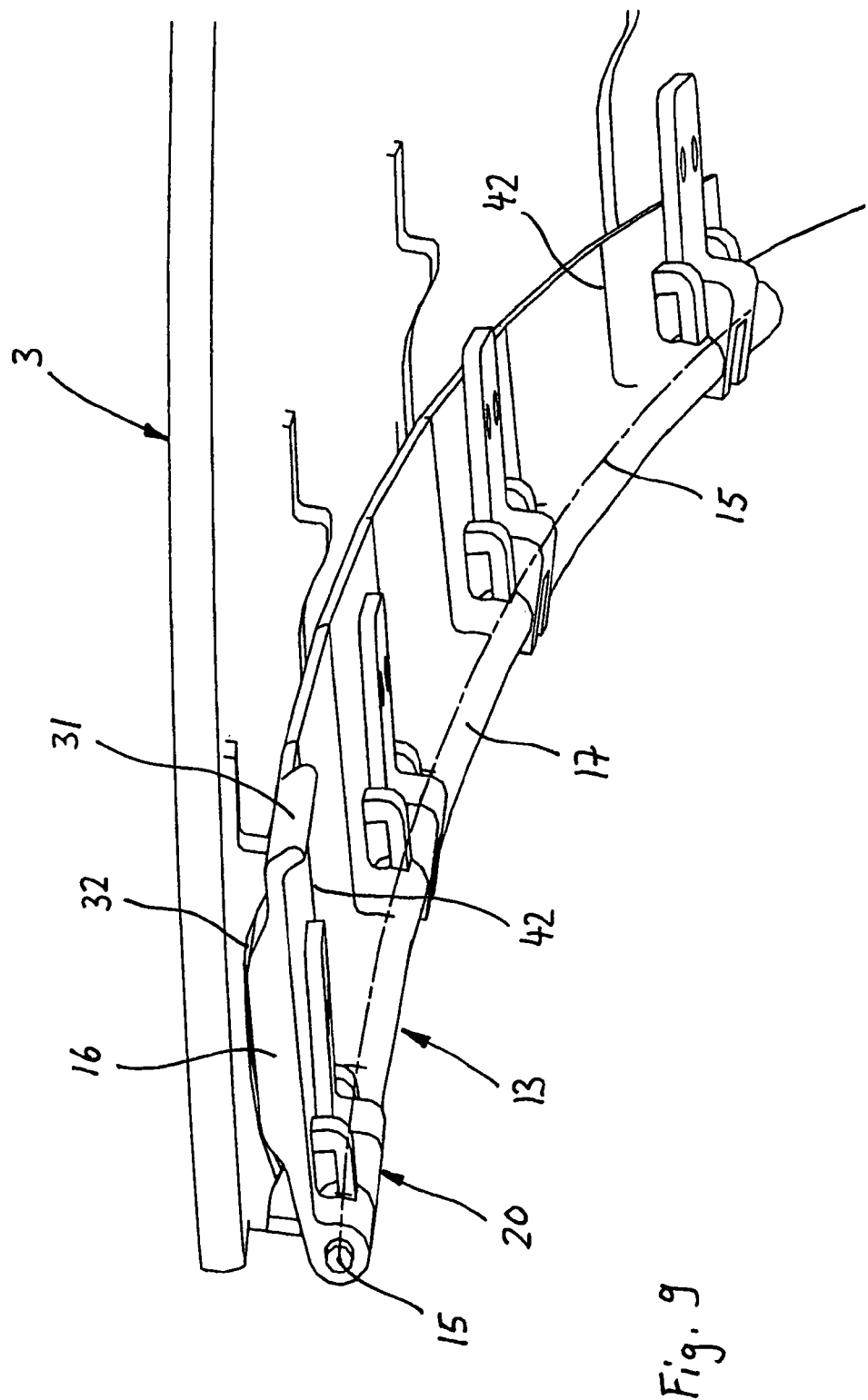
Figure 10:
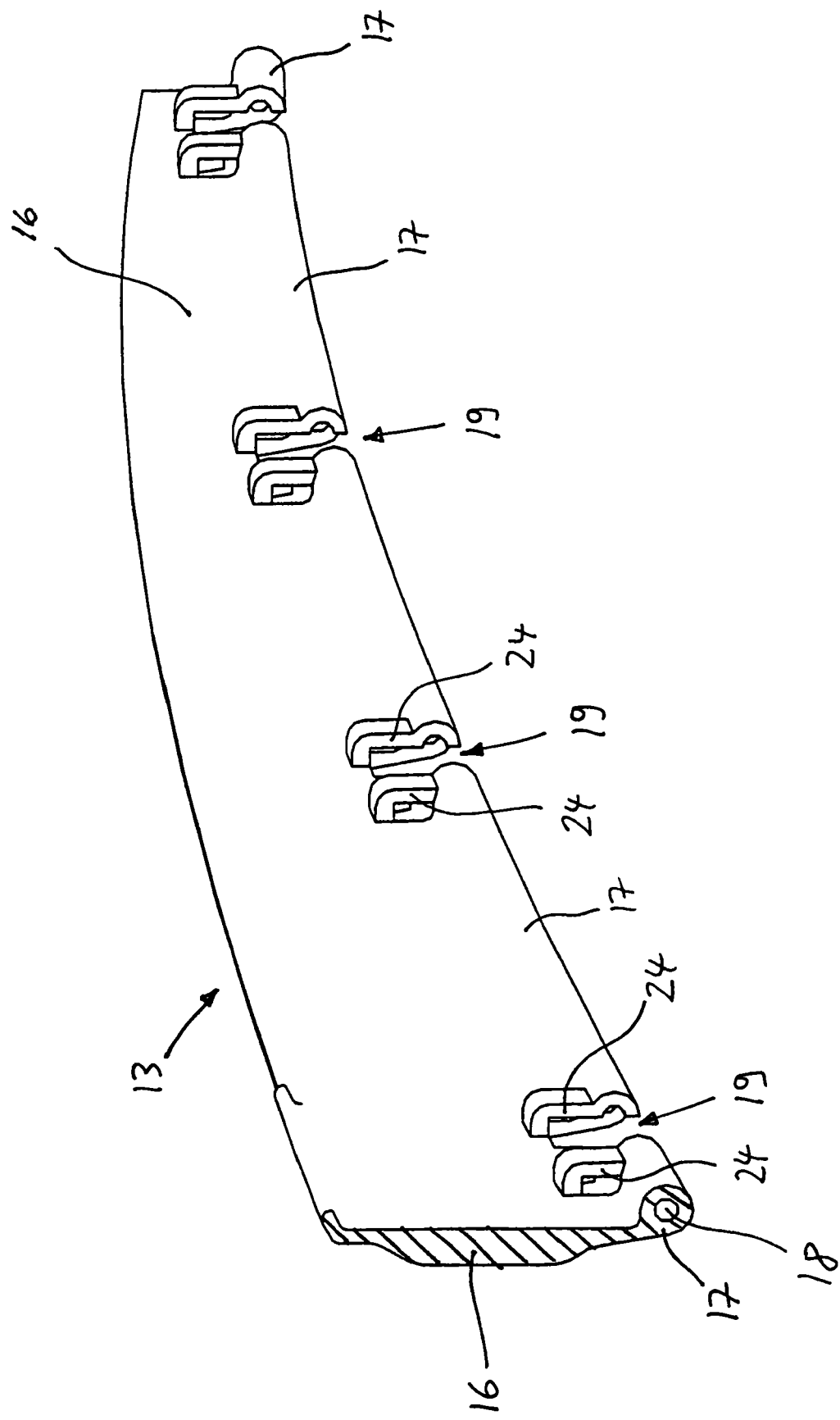
Figure 11:
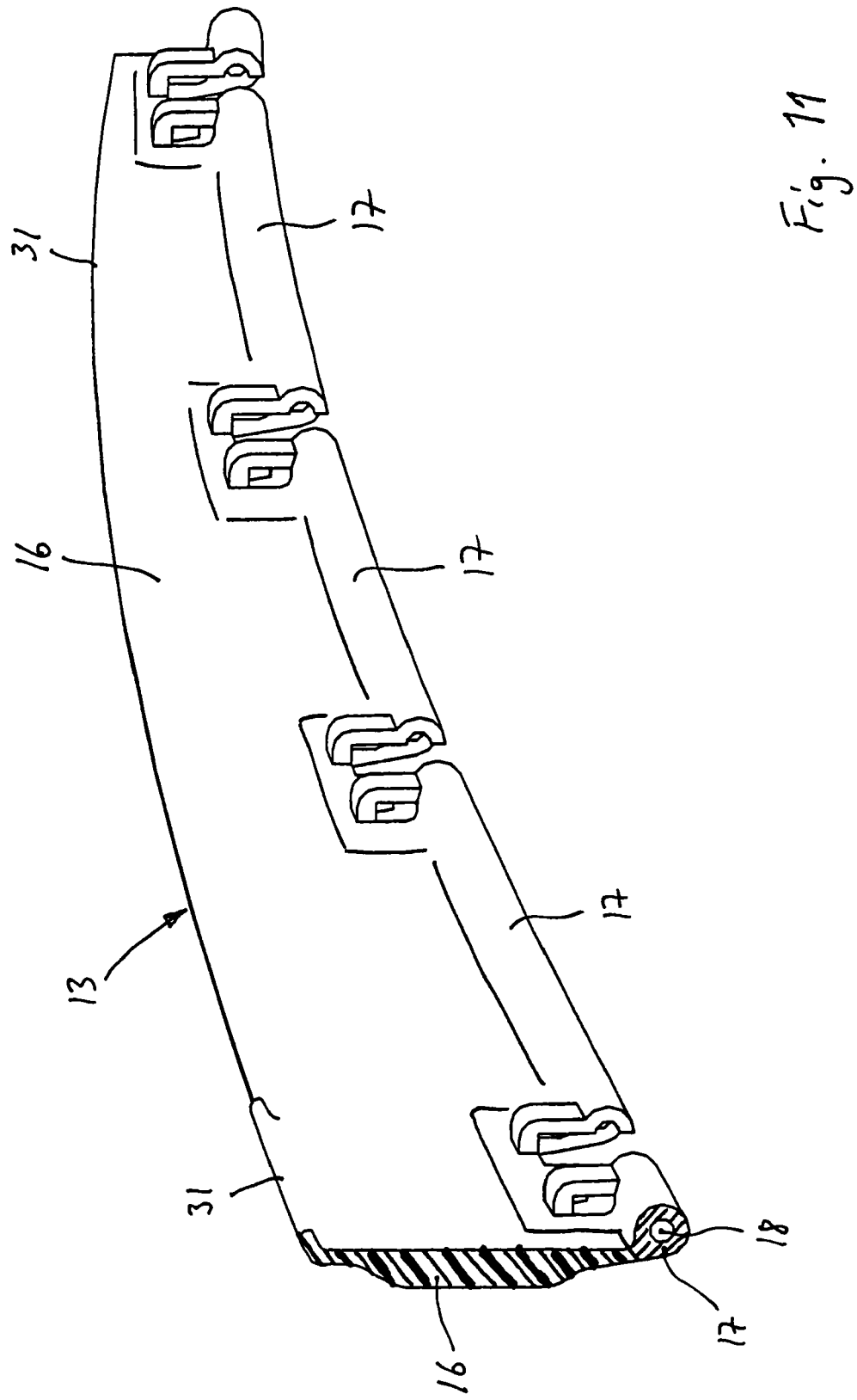
Figure 12:
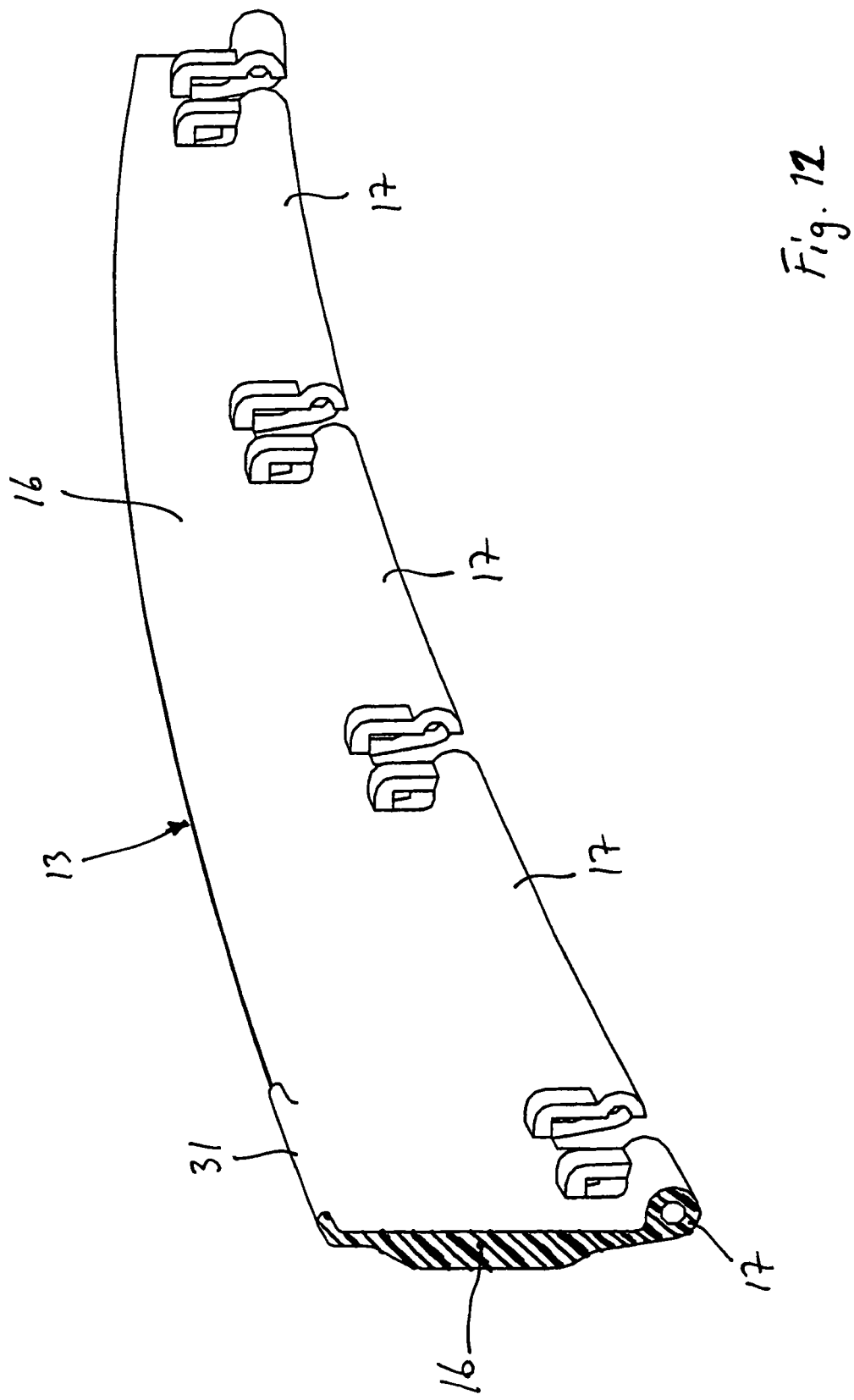
Figure 17:
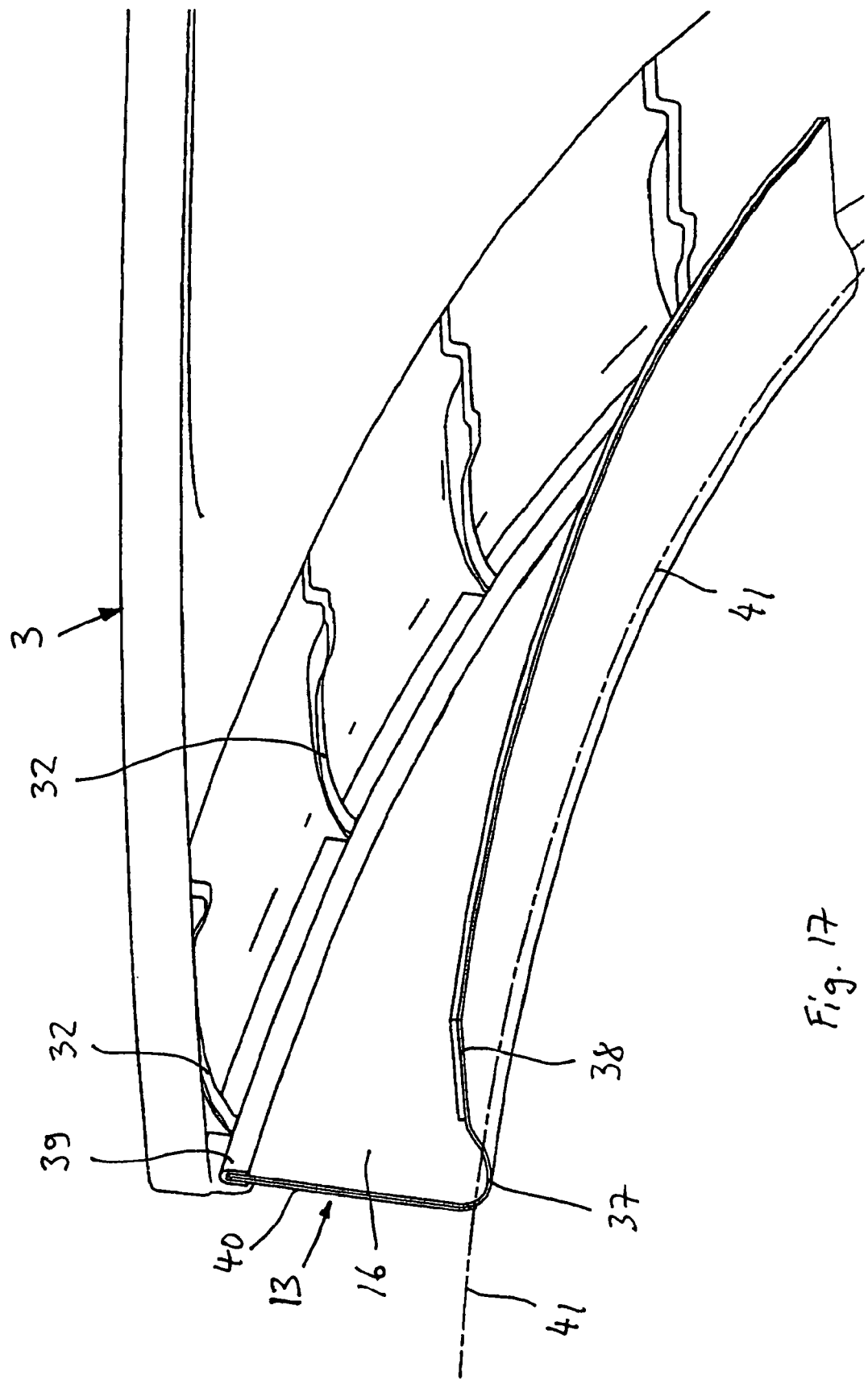
Figure 18:
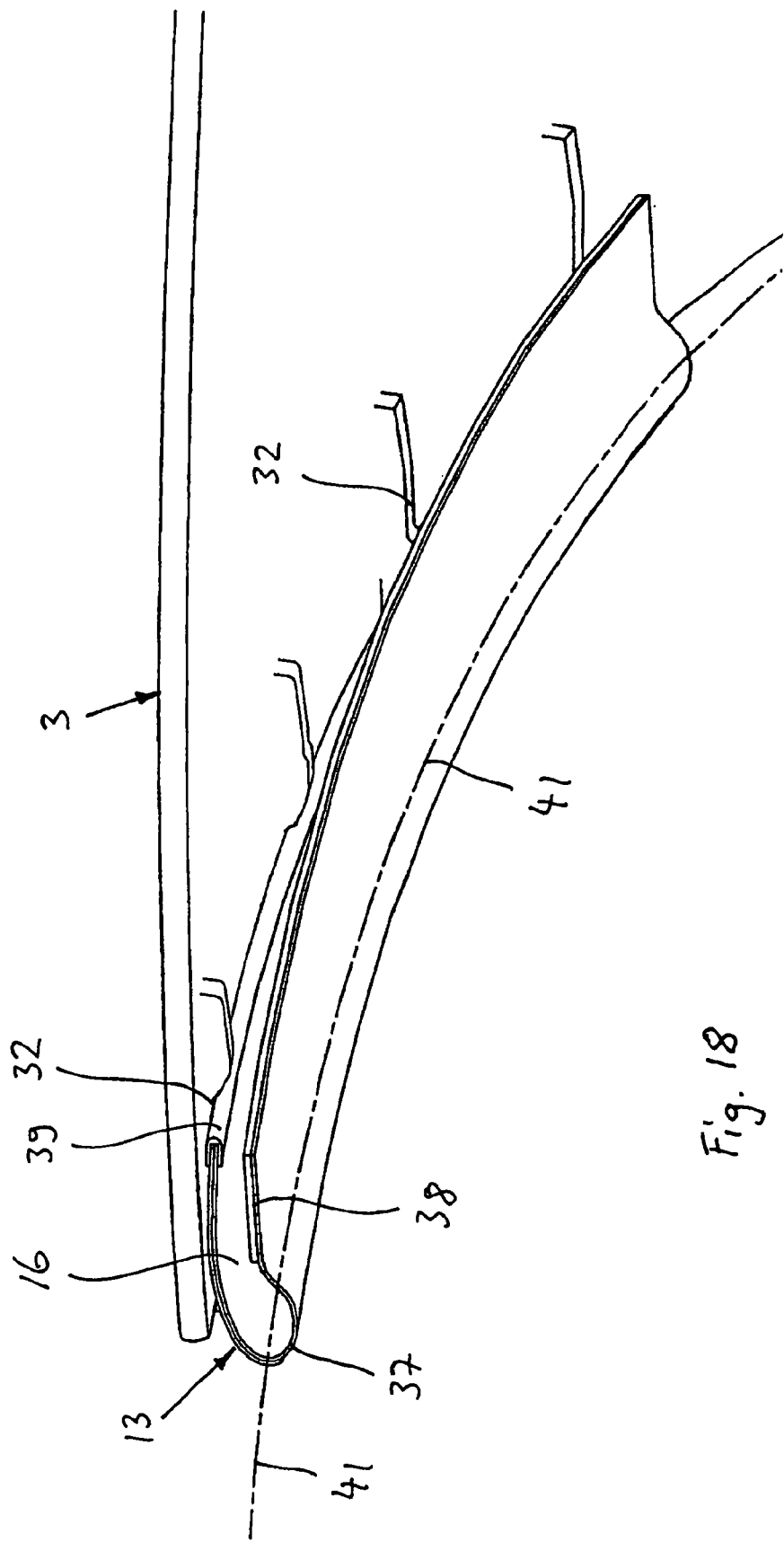

FIG. 8 Perspective head-on view of the underside of the cover in the position as per FIG. 5 with the side panel pivoted by the cover into a slanted intermediate position FIG. 9 Perspective head-on view of the underside of the cover in the position as per FIG. 6 with the side panel pivoted down away FIG. 10 Perspective top-down view of an embodiment example of the side panel FIG. 11 Perspective top-down view of another embodiment example of the side panel FIG. 12 Perspective top-down view of another embodiment example of the side panel FIG. 13 Perspective top-down view of another embodiment example of the side panel FIG. 14 Top-down view of the narrow side of the side panel shown in FIG. 13, which narrow side is directed against the cover FIG. 15 Transverse cross section as per FIG. 4 of another embodiment example of an invention-specific side panel with the cover placed in the ventilation position FIG. 16 Transverse cross section of the side panel as per FIG. 15, in a position pivoted out downwards by the cover FIG. 17 Perspective top-down view of the side panel shown in FIG. 15, on the deployed cover and FIG. 18 Perspective top-down view of the side panel shown in FIG. 16, on the closed cover A motor vehicle or a passenger car comprises a vehicle roof 1 that is to be opened or capable of being opened with a roof opening 2, in which a movable cover 3 is situated as a tilt-slide roof, which is adjustable between a closed position, in which it is flush with the adjoining roof surface 4 and on both sides to the lateral roof rails 5 (FIG. 1), and a ventilation position, in which it, with its rear edge, is pivoted upwards over the roof surface 4 or the lateral roof rails 5 (FIG. 2). The cover 3, which is movably mounted by means of mechanical cover components (not shown) bilaterally onto longitudinal guides 7 (see FIG. 3) placed securely on the roof, is movable from the ventilation position rearwards over the adjoining roof surface 4, which can be the fixed vehicle roof or an adjoining roof component such as another cover, for example.

As a structural unit, the tilt-slide roof has a frame 8 (see FIG. 4), by which it is attached by means of an adhesive bead 9 to a horizontal, inward-directed flange 10 of the lateral roof rail 5 that extends in the longitudinal direction of the roof. At least in the area of the cover 3, the lateral roof rail 5 runs outwards at a slant and is curved to correspond to the shape of the roof. The cover 3 is adapted to this roof shape and the shape of the lateral roof rail 5, and in a top-down view is in a roughly trapezoidal form with a narrower or shorter front edge 11 in the direction of the width and a wider or longer rear edge 6, as well as being curved at least in the longitudinal direction.

A side panel 13 assigned to the lateral edge 12 of the cover 3 is attached in the longitudinal direction by means of a pivot mounting 14 which runs roughly under the lateral edge 12 of the cover 3 (see FIG. 4), with a pivoting axis 15 of the pivot mounting 14 being curved in three-dimensional fashion. This curvature is designated as three-dimensional curvature, because it or the pivoting axle 15 follows the curvature of the roof in the longitudinal direction as well as in the lateral direction.

The side panel 13 has a planar panel slat 16 with a pivot mounting area 17 on the inner edge (see FIG. 10), which is formed for example as a cylindrical thickening, and has a longitudinal borehole 18 to receive a mounting axis that forms the pivoting axis 15, such as a mounting wire, for example. The pivot mounting area 17 of side panel 13 is interrupted multiple times, and according to the embodiment example, four times for example (see FIGS. 7 and 10), with each interruption 19 able to receive a mount-holding piece 20, which on the one side holds the pivoting or mounting axle 15, and on the other side for example is attached with a tongue extension 21 on the roof side, for example on the lateral roof rail 5 or on the frame 8 of the tilt-slide roof.

One arm 22 of the mount-holding piece 20 has a mount stop 23, which projects out from arm 22 on both sides as a dual shoulder roughly over the pivoting axle 15. On the side panel 13, in the area of each interruption 19, a panel stop 24 is formed for example as a dual-sided mold, and assigned to the mounting stop 23. A spring 25 (see the schematic depiction in FIG. 8) provides pretensioning to the side panel 13 in its vertical covering position and against the mounting stop 23.

On its lateral edge 12, the cover 3 has a downward-projecting vertical cover panel 26, on which, when the cover 3 is closed (see FIG. 6) a seal 27 adjoins in sealing fashion, which is attached onto the lateral roof rail 5 and when the cover 3 is closed, fills the groove-shaped gap between the cover 3 or the cover panel 26 and a vertical section of the lateral roof rail 5 in sealing fashion.

On its lower end, the cover panel 26 contains an interior contact surface 28, on which the side panel 13 in its essentially vertical covering position tightly adjoins an outer surface 29, which is formed on its tapered outer edge section 30, lying opposite the pivot mounting 14. The outer edge section 30 additionally contains an edge-side engagement lug 31, which is slidingly engaged with a cover guidance curve 32, when the deployed cover 3 drops down (position of FIG. 4 via FIG. 5 to FIG. 6). Multiple cover guidance curves 32 are situated at intervals to each other on the underside 33 of the cover, and run from the contact surface 28 of the cover panel 26 inwards in the transverse cover direction, and correspondingly are in engagement with the cover panel 26. Instead of multiple cover guidance curves 32, also one planar cover guidance curve, continuous in the longitudinal direction, can be provided, which engages over the entire edge-side engagement lug 31 with the cover panel 26.

The cover guidance curves 32 (or the planar cover guidance curve) are formed, for example, together with the cover panel 26 as a one-piece foam fabrication surrounding the cover. On the other hand they can also be independent components that are attached by gluing, for example, on the cover 3, or they can be formed as a single piece with the cover 3 that, for example, is produced of plastic.

When the cover 3 is pivoted up (FIG. 1 to FIG. 2), the side panel 13 is raised up owing to the force of the spring 25, and covers the lateral gap between the cover panel 26 and the lateral roof rail 5 (see FIG. 4). The outer surface of the panel slat 16 which stands roughly vertically lies in a plane with the cover panel 26. The seal 27 lies in sealing fashion on a tapered lower section of the panel slat 16. By this means a covering is obtained that is aerodynamically favorable and largely vortex-free, thus also evoking less aerodynamic noise. Also attained is a visually appealing covering of the mechanical cover components that lie behind it.

In this upward-pivoted position, the cover 3 can be pushed rearwards into a backwards position over the rear roof surface 4 (FIG. 3) to reveal the roof opening 2. With this the side panel 13 can be pivoted about from the front edge 11 of the cover 3 to the extent required. If then the side panel 13 in its vertical covering position has no contact with the cover 3, it adjoins the stop 23 with its panel stop 24, and maintains its vertical position, until the cover 3 is again moved forward from a backwards position, and tightly adjoins the outer surface 29 of the side panel 13 with its contact surface 28.

When the cover 3 is lowered from its ventilation position depicted in FIG. 2 and FIG. 4, the engagement lug 31 of the side panel 13 slides along the roof guidance curves 32 via the intermediate position of FIG. 5 into the end position of FIG. 6, in which the side panel 13 is totally pivoted down, and comes in planar contact with its outer surface 29 on a support surface 34 at the end of the cover guidance curve 32.

With the described and depicted swiveling about the three-dimensionally curved or bowed pivot axis 15, the side panel 13 must be able to undergo flexible deformation. In a first embodiment form of the side panel 13, in which the pivot axis 15 has a relatively small curvature or bowing, the side panel 13 (see FIG. 10) both in the area of the panel slat 16 and in its pivot mounting area 17, consists of a comparatively less flexible material having high strength and stiffness, especially a harder plastic such as PA 6, which can undergo the lesser deformation in the vicinity of the pivot mounting area 17 close to the pivot axis 15, as well as the greater deformation of the panel slat 16 more distant from the pivot axis 15.

In a further embodiment form, in which the pivot axis 15 has a sharper curvature or bowing than the previously described embodiment form, and average as regards the possibilities for use, the side panel 13 (see FIG. 11) is manufactured as a 2-component panel or 2K panel of plastic, with the pivot mounting area 17 being produced from a comparatively hard thermoplastic such as PA 6 for example, and the panel slat 16 of a comparatively soft thermoplastic such as EPDM or TPE being sprayed on. While, with the pivoting of the side panel 13, the plastic of the pivot mounting area 17 that is harder than on the component lying on pivot axis 15 must undergo less deformation, and can undergo this deformation despite its hardness, the softer plastic of the panel slat 16 better permits the required greater flexible deformations.

Lastly, in a third embodiment form (see FIG. 12), both in the area of the panel slat 16 and in the pivot mounting area 17, the side panel 13 is manufactured from a comparatively very soft and flexible material, for example a plastic such as EPDM or TPE, with correspondingly low Shore hardness. Thus the side panel 13, as compared with the previously described embodiment forms, is suitable for still more severely curved or bowed pivot axes 15, since both in the pivot mounting area 17 and in the area of the panel slat 16 distant from the pivot axis 15, it can be flexibly deformed to the particular necessary degree.

The embodiment form of the side panel 13 of FIGS. 13 and 14 contains an altered panel geometry or panel configuration. The panel slat 16 is formed in the manner of a comb with fins 36 separated by slots 35. The slots 35 extend from the outer edge, for example roughly radially toward the pivot mounting area 17, and exhibit an inclined direction at an acute angle to the direction of air flowing along the outer side of the side panel 13 (shown by an arrow in FIG. 14), so that the air flow passes by in the sequence of the fins 36 and the slots 35. The side panel 13 can be manufactured from a stronger and harder plastic like PA 6 for example, or of comparable plastics. The slots 35 reduce the resistance of the panel slat 16 to the required deformation. The radial length of the slots 35 can be determined to be in correspondence with the required deformation.

Fundamentally other materials can also be used for the design of the invention-specific side panel 13, which make possible the required flexible deformation with corresponding curvature or bowing of the pivot axis 15.

With a further embodiment form (see FIGS. 15 to 18) of an invention-specific side panel 13, the entire pivot mounting 14 is formed from a pivot mounting area 37 of the side panel 13, which is subjected to elastic deformation when the side panel 13 pivots. In this the side panel 13 differs from the previously described side panels, in which the particular pivot bearing area 15 pivots about a real solid pivot axis 15 relative to the stationary mount holding piece 20. With the side panel 13 described here, the pivot mounting area 37 makes a transition to an attachment section 38, which is fixed in the same way as the mount holding piece 20 of the previously described side panels, for example on the frame 8.

Preferably the side panel 13 is manufactured in essence as a single piece from a plastic, a metal or a composite material, and overall is elastically deformable, in order, when pivoted, to be able to adapt to the curved or bowed pivot axis, with the pivot mounting area 37 additionally exhibiting the required elastic ductility for the pivot mounting function. On the outer edge of its panel slat 16 the side panel 13 has a closer strip 39, which protectively encloses the outer edge and slides along on the cover guidance curves 32 as an actuator element for adjusting the side panel 13 to the cover guidance curves 32, when the cover 3 is raised or lowered, as well as serving for sealing contact on the contact surface 28 of the cover panel 26. In the area of the panel slat 16, the side panel 13 may exhibit a second layer 40 or coating. This can, for example, be a fabric or material for optical adaptation or a layer connected securely with the panel slat 16 to increase the strength or the deformation resistance of the side panel 13 in the area of the panel slat 16. Through its U-shaped wraparound, the closer strip 39 protects this dual-layer structure on the outer edge of the panel slat 16. The second layer or coating can be provided on the inner side as well also as on the outer side on the panel slat 16.

When the cover 3 has been pivoted up (see FIGS. 15 and 17) the side panel 13—in correspondence to the previous embodiment examples—assumes its roughly vertical covering position. When the cover 3 is lowered, the guidance curves 32, in engagement with the closer strip 39, pivot the panel slat 16 into the position of FIGS. 16 and 18. For lack of a solid formed pivot axis, a pivot axis 41 in the pivot mounting area 37 is formed as a curved three-dimensional line, which, when the side panel 13 is pivoted, can undergo three-dimensional shifting and adjustment in dependence on the pivot position as the particular instantaneous pivot axis.

The panel slat 16 of the invention-specific side panel 13 can in principle be formed as a single piece or multiple pieces. The lines 42 drawn in on FIGS. 7 to 9, which are drawn to run from the outer edge roughly radially toward the pivot axis 15, are to schematically depict separation locations or elastic connection areas between the panel sections lying between, which can provide support to the elastic ductility of the overall panel slat 16 or of the side panel 13.

The engagement lug 31 is depicted in FIGS. 7 to 9 for the sake of simplicity only as a short section on the rear end of the side panel 13. Understandably, to each cover guidance curve 32 an engagement lug 31 is assigned or the engagement lug 31 extends over the entire length of the side panel 13.

The individual features of the invention disclosed in the specification and with the aid of the embodiment examples can be combined in any technically appropriate arrangements and configurations with the subject of the invention in its general form.

The invention claimed is:

1. A side panel of a vehicle roof that can be opened, which is provided for closing a lateral opening between a cover raised over the vehicle roof and the adjoining vehicle roof, comprising:
    a panel slat and
    a pivot mounting with a pivot mounting area being attachable on the roof side and extending along the side panel, the panel slat configured to be pivotable about the pivot mounting area,
    wherein the pivot mounting area of the pivot mounting comprises a solid, curved or bowed pivot axis or wherein the pivot mounting is formed from a flexibly deformable pivot mounting area of the side panel and a curved or bowed pivot axis positioned as an instantaneous pivot axis corresponding to the particular pivoting position of the panel slat.

2. The side panel of claim 1, wherein the pivot mounting area containing the pivot axis and the panel slat, and that the material of the pivot mounting area and the material of the panel slat is configured for a flexible deformation with pivoting of the side panel about a curved or bowed pivot axis.

3. The side panel of claim 2, wherein the pivot mounting area and the panel slat are made from the same material with the same properties determining the ductility, and that the material comprises a greater deformation resistance for the pivot axis with less curvature or bowing and a lesser deformation resistance for the pivot axis with sharper curvature or bowing.

4. The side panel of claim 3, wherein the pivot mounting area is formed from a material with greater deformation resistance and the panel slat is of different material having a lesser deformation resistance.

5. The side panel of claim 2, wherein the panel slat contains slots, which extend from their outer edge toward the pivot mounting area and form fins separated from each other, which, when the side panel is swiveled, can be deformed against each other.

6. The side panel of claim 1, wherein the cover comprises at least one cover guidance curve for pivoting the side panel on its cover underside.

7. The side panel of claim 1, wherein the side panel is placed in pre-tension in an essentially vertical covering position, and can be made to adjoin against a stop.

8. The side panel of claim 1, wherein in the vertical covering position, the side panel adjoins on a lateral edge of the covering in sealing fashion.

9. The side panel of claim 1, wherein the side panel or the panel slat tapers down in its radial extension relative to the pivot axis over its length from its rear end to its front end.

10. A vehicle roof capable of being opened with a roof opening and a covering able to be lifted from the roof opening and with a side panel according to claim 1.

* * * * *